United States Patent
Inoue et al.

(10) Patent No.: US 10,610,952 B2
(45) Date of Patent: Apr. 7, 2020

(54) WELDING WIRE PROCESSING STRUCTURE OF ARC WELDING ROBOT

(71) Applicant: FANUC CORPORATION, Yamanashi (JP)

(72) Inventors: Toshihiko Inoue, Yamanashi (JP); Shunsuke Abiko, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/841,341

(22) Filed: Dec. 14, 2017

(65) Prior Publication Data

US 2018/0178309 A1    Jun. 28, 2018

(30) Foreign Application Priority Data

Dec. 22, 2016   (JP) .................. 2016-249202

(51) Int. Cl.
| | |
|---|---|
| *B23K 9/32* | (2006.01) |
| *B25J 15/04* | (2006.01) |
| *B23K 9/133* | (2006.01) |
| *B25J 19/00* | (2006.01) |

(52) U.S. Cl.
CPC .............. *B23K 9/323* (2013.01); *B23K 9/133* (2013.01); *B25J 15/0491* (2013.01); *B25J 19/00* (2013.01)

(58) Field of Classification Search
CPC . B23K 9/00; B23K 9/12; B23K 9/125; B23K 9/32; B23K 9/323; B23K 9/13; B23K 9/133; B23K 9/1336
USPC ..... 219/125.1, 130.1, 137.31, 137.44, 137.2, 219/137.51, 137.63
See application file for complete search history.

(56) References Cited

U.S. PATENT DOCUMENTS

| | | | | |
|---|---|---|---|---|
| 3,654,425 A | * | 4/1972 | Nomura ................... | B23K 9/02 219/124.22 |
| 4,057,705 A | * | 11/1977 | Cockrum ................ | B08B 15/04 219/137.41 |
| 4,206,862 A | * | 6/1980 | DaCosta .............. | B23K 9/1336 219/137.2 |

(Continued)

FOREIGN PATENT DOCUMENTS

| | | |
|---|---|---|
| CN | 1910005 A | 2/2007 |
| CN | 202655769 U | 1/2013 |

(Continued)

OTHER PUBLICATIONS

Japanese Decision to Grant a Patent dated Jul. 3, 2018, in connection with corresponding JP Application No. 2016-249202 (6 pgs., including English translation).

(Continued)

*Primary Examiner* — Dana Ross
*Assistant Examiner* — Ayub A Maye
(74) *Attorney, Agent, or Firm* — Maier & Maier, PLLC

(57) ABSTRACT

There is provided a welding wire processing structure, of an arc welding robot, including a wire hose for feeding a welding wire to a wire feeder that is attached to a rear portion of an arm provided with a welding torch at a tip, from a rear end surface of the wire feeder to a forward side, and a connector for attaching the wire hose to the rear end surface, where the connector connects the wire hose in a direction intersecting a feed direction of the welding wire by the wire feeder.

5 Claims, 10 Drawing Sheets

(56) References Cited

U.S. PATENT DOCUMENTS

| | | | |
|---|---|---|---|
| 4,952,769 A * | 8/1990 | Acheson | B23K 9/048 |
| | | | 219/125.11 |
| 8,129,660 B2 * | 3/2012 | Schorghuber | B23K 9/133 |
| | | | 219/137.2 |
| 8,704,132 B2 * | 4/2014 | Artelsmair | B23K 9/1333 |
| | | | 219/121.11 |
| 2005/0189333 A1 | 9/2005 | Nakagiri et al. | |
| 2007/0017911 A1 | 1/2007 | Mishima et al. | |
| 2007/0051711 A1 * | 3/2007 | Kachline | B23K 9/1056 |
| | | | 219/130.01 |
| 2007/0151964 A1 | 7/2007 | Artelsmair et al. | |
| 2008/0056859 A1 | 3/2008 | Inoue et al. | |
| 2008/0236324 A1 * | 10/2008 | Inoue | B25J 9/046 |
| | | | 74/490.02 |
| 2008/0257868 A1 * | 10/2008 | Sassatelli | B23K 9/291 |
| | | | 219/76.14 |
| 2010/0032420 A1 | 2/2010 | Inoue et al. | |
| 2011/0042355 A1 * | 2/2011 | Gelmetti | B23K 9/1333 |
| | | | 219/73 |
| 2011/0114617 A1 | 5/2011 | Gelmetti et al. | |
| 2013/0168479 A1 | 7/2013 | Cooper | |
| 2015/0076213 A1 * | 3/2015 | Terada | B23K 9/133 |
| | | | 228/41 |
| 2016/0008905 A1 * | 1/2016 | Izawa | B25J 15/0019 |
| | | | 219/130.1 |
| 2017/0129035 A1 * | 5/2017 | Westlake | B23K 9/1006 |
| 2017/0200384 A1 * | 7/2017 | Albrecht | G09B 19/24 |
| 2018/0050415 A1 * | 2/2018 | Kachline | B23K 9/125 |

FOREIGN PATENT DOCUMENTS

| | | |
|---|---|---|
| CN | 107552922 A | 1/2018 |
| EP | 1 568 449 A1 | 8/2005 |
| EP | 1669151 A1 | 6/2006 |
| EP | 1892064 A1 | 2/2008 |
| JP | S58-147675 U | 10/1983 |
| JP | S61-72372 U | 5/1986 |
| JP | H03-297568 A | 12/1991 |
| JP | 2005-238428 A | 9/2005 |
| JP | 2006-007256 A | 1/2006 |
| JP | 2006-341278 A | 12/2006 |
| JP | 2008-073833 A | 4/2008 |
| JP | 2011-067893 A | 4/2011 |
| JP | 4741639 B | 8/2011 |
| JP | 2012-035284 A | 2/2012 |
| JP | 2013-75319 A | 4/2013 |
| JP | 2015-142926 A | 8/2015 |
| JP | 2015-199091 A | 11/2015 |
| JP | 2017-136613 A | 8/2017 |

OTHER PUBLICATIONS

Japanese Office Action dated Mar. 13, 2018, in connection with corresponding JP Application No. 2016-249202 (6 pgs., including English translation).

German Office Action dated Dec. 12, 2018, in connection with corresponding DE Application No. 10 2017 130 48.4 (15 pgs., including English translation).

* cited by examiner

WELDING WIRE PROCESSING STRUCTURE OF ARC WELDING ROBOT

CROSS-REFERENCE TO RELATED APPLICATIONS

This application is based on Japanese Patent Application No. 2016-249202, the contents of which are incorporated herein by reference.

TECHNICAL FIELD

The present invention relates to a welding wire processing structure of an arc welding robot.

BACKGROUND

Conventionally, as an arc welding robot, one having a wire feeder disposed at a rear portion of a forearm is known, where a welding wire guided from behind the arc welding robot is disposed to pass through the wire feeder in a forward-backward direction and is fed by the wire feeder to a welding torch attached at a tip of the forearm.

SUMMARY OF INVENTION

An aspect of the present invention provides a welding wire processing structure of an arc welding robot, the welding wire processing structure including a wire hose for feeding a welding wire to a wire feeder that is attached to a rear portion of an arm provided with a welding torch at a tip, from a rear end surface of the wire feeder to a forward side, and a connector for attaching the wire hose to the rear end surface, where the connector connects the wire hose in a direction intersecting a feed direction of the welding wire by the wire feeder.

DESCRIPTION OF EMBODIMENTS

A welding wire processing structure 1 of an arc welding robot 100 according to an embodiment of the present invention will be described below with reference to the drawings.

Figure 1:
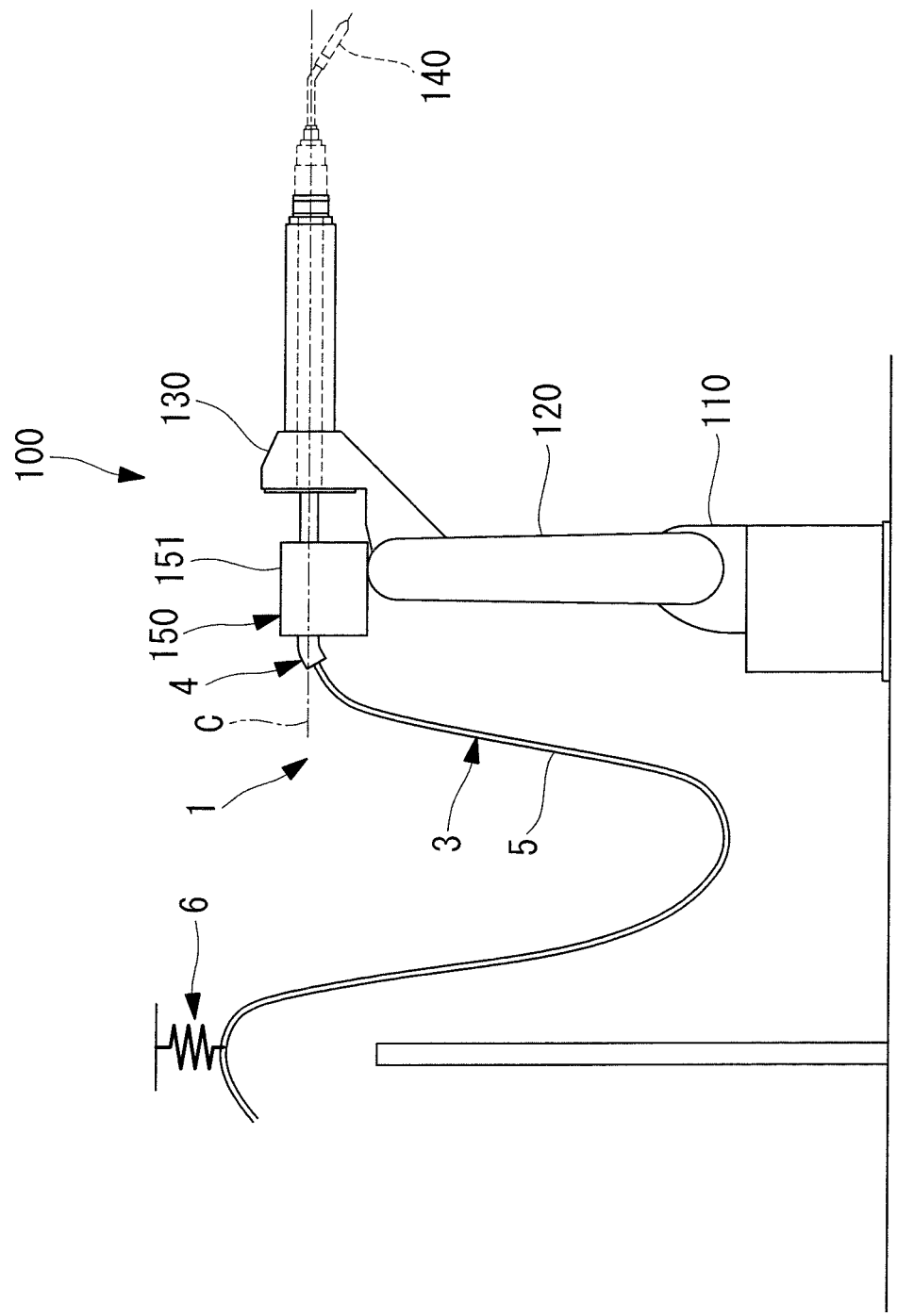
FIG. 1 is a diagram showing an arc welding robot provided with a welding wire processing structure according to an embodiment of the present invention.

As shown in FIG. 1, the welding wire processing structure 1 according to the present embodiment is a welding wire processing structure of a vertical articulated arc welding robot 100, for example.

The arc welding robot 100 includes a base 110 capable of rotating around a vertical axis line, a first arm 120 supported by the base 110 in a manner capable of swinging around a horizontal axis line, a second arm (arm) 130 supported at a tip of the first arm 120 in a manner capable of swinging around the horizontal axis line, a welding torch 140 attached at a tip of the second arm 130, and a wire feeder 150 attached to a rear portion of the second arm 130.

Figure 2:
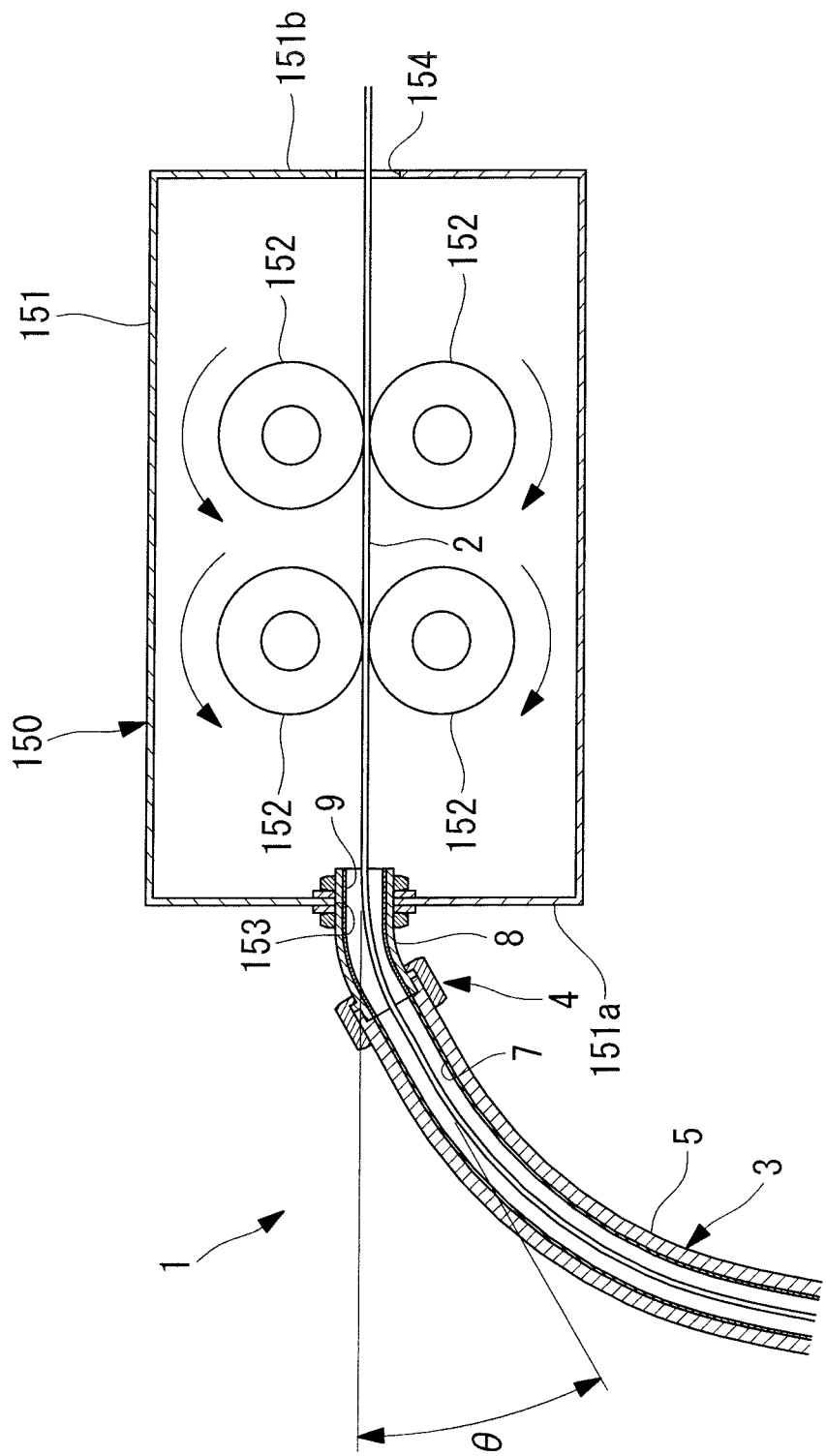
FIG. 2 is a vertical cross-sectional view of a wire feeder, showing the welding wire processing structure of FIG. 1.

As shown in FIG. 2, the wire feeder 150 includes a housing 151 attached to the rear portion of the second arm 130, and wire feed rollers 152 disposed inside the housing 151. The housing 151 is provided with an inlet 153, at a rear end surface 151a, through which a welding wire 2 which is fed from behind enters, and a feed port 154, at a front end surface 151b, through which the welding wire 2 is fed forward. In FIG. 1, a reference sign C indicates an axis line along a feed direction of the welding wire 2 inside the housing 151.

At least one pair (two pairs, in the example shown in FIG. 2) of wire feed rollers 152 are disposed at positions of radially sandwiching the welding wire 2 extending in the forward-backward direction inside the housing 151, such that the welding wire 2 enters through the inlet 153 and is fed from the feed port 154. The wire feed rollers 152 of each pair are rotated in opposite directions by a motor, not shown, and thereby transmit a drive force to the sandwiched welding wire 2 by friction and feeds the welding wire 2 along the longitudinal direction.

The welding wire processing structure 1 according to the present embodiment includes a wire hose 3 for feeding the welding wire 2 from behind the arc welding robot 100, and a connector 4 for attaching the wire hose 3 to the inlet 153 on the rear end surface 151a of the housing 151 of the wire feeder 150.

As shown in FIG. 2, the wire hose 3 includes an outer tube 5 having flexibility, and a coil liner 7 disposed inside the outer tube 5 and covering an inner surface. The welding wire 2 is fed through the coil liner 7 inside the wire hose 3. Also, the wire hose 3 is supported behind the arc welding robot 100 by a ceiling suspension type holder 6, at a mid-portion in the longitudinal direction.

Figure 3:
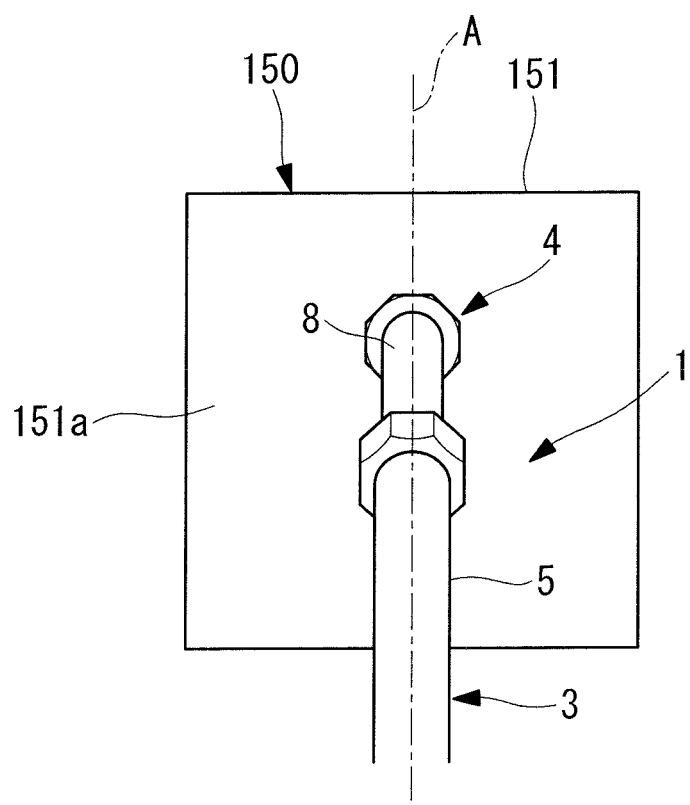
FIG. 3 is a rear view of the welding wire processing structure, showing the wire feeder of FIG. 2 from behind.

As shown in FIG. 2, the connector 4 detachably attaches one end of the wire hose 3, and fixes the wire hose 3 to the housing 151 in such a way that a longitudinal axis of the wire hose 3 at the attachment position to the connector 4 intersects with a feed direction of the welding wire 2 inside the housing 151. As shown in FIG. 3, the connector 4 attaches the wire hose 3 in such a way that the wire hose 3 extends obliquely downward on a vertical plane A. An intersection angle θ between the longitudinal axis of the wire hose 3 at the attachment position to the connector 4 and the feed direction of the welding wire 2 inside the housing 151 is between 30 degrees and 90 degrees, inclusive, and more preferably, the angle is between 30 degrees and 45 degrees, inclusive.

The connector 4 includes a connector main body 8 having a hollow portion, and a coil liner 9 disposed so as to cover an inner surface of the connector main body 8. The welding wire 2 fed through the wire hose 3 passes through the coil liner 9 of the connector 4 and is fed into the housing 151 through the inlet 153 of the housing 151.

Effects of the welding wire processing structure 1 of the arc welding robot 100 according to the present embodiment configured in the above manner will be described below.

According to the welding wire processing structure 1 of the present embodiment, the welding wire 2 that is fed by the wire hose 3 from behind the arc welding robot 100 passes through the coil liner 9 of the connector 4 and enters the wire feeder 150 through the inlet 153 of the housing 151, is moved forward in the longitudinal direction by the wire feed rollers 152 by application of the drive force, and is fed to the welding torch 140 attached at a tip of the second arm 130.

In this case, because the connector 4 attaches the wire hose 3 to the rear end surface 151a of the wire feeder 150 with the wire hose 3 inclined obliquely downward, the welding wire 2 fed through the wire hose 3 is bent inside the connector 4 and then enters the housing 151 through the inlet 153.

Accordingly, the wire hose 3 is suppressed from greatly protruding rearward from the rear end surface 151a of the wire feeder 150.

Figure 4:
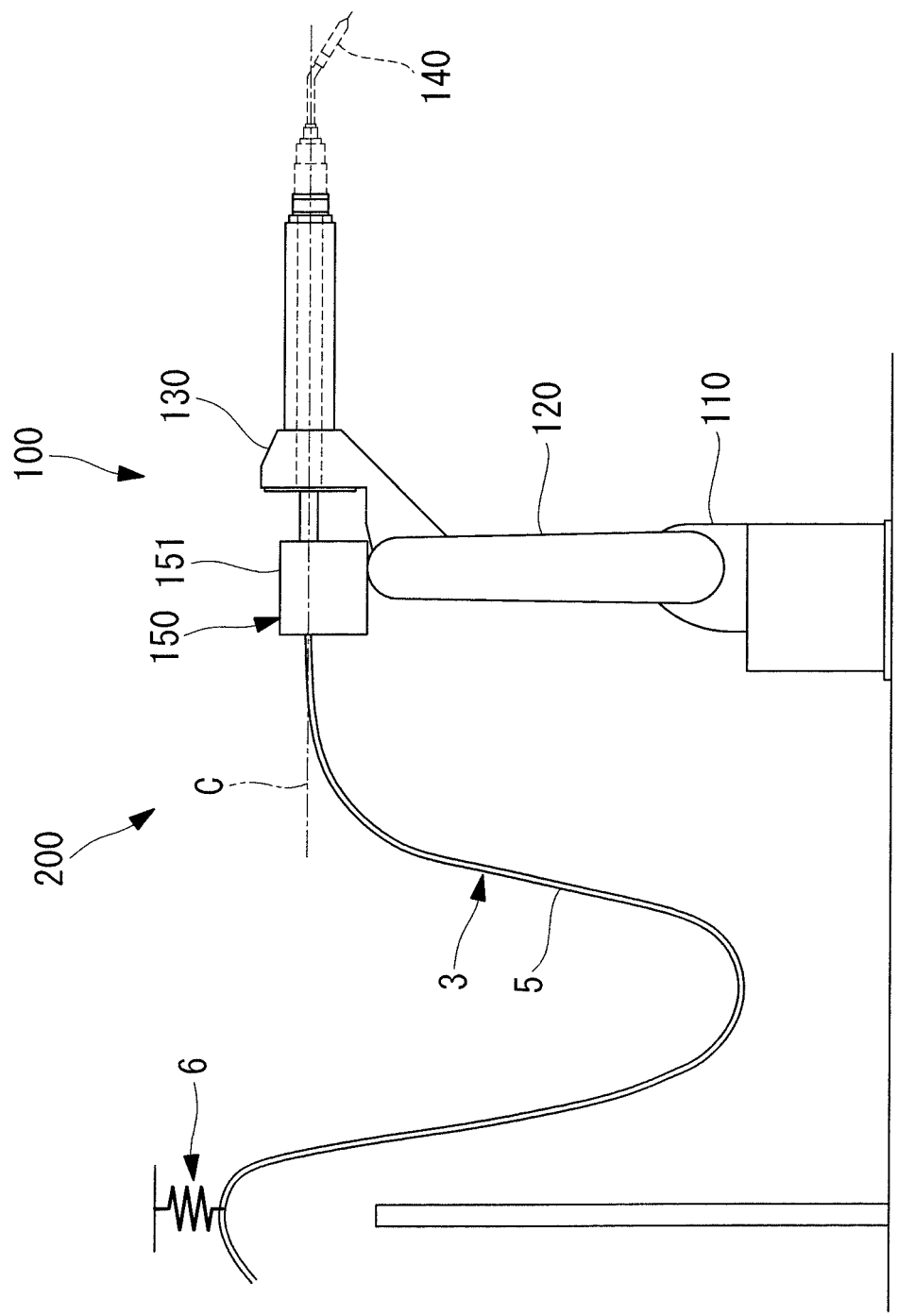
FIG. 4 is a diagram showing a conventional comparative example for describing an effect of the welding wire processing structure of FIG. 1.
Figure 5:
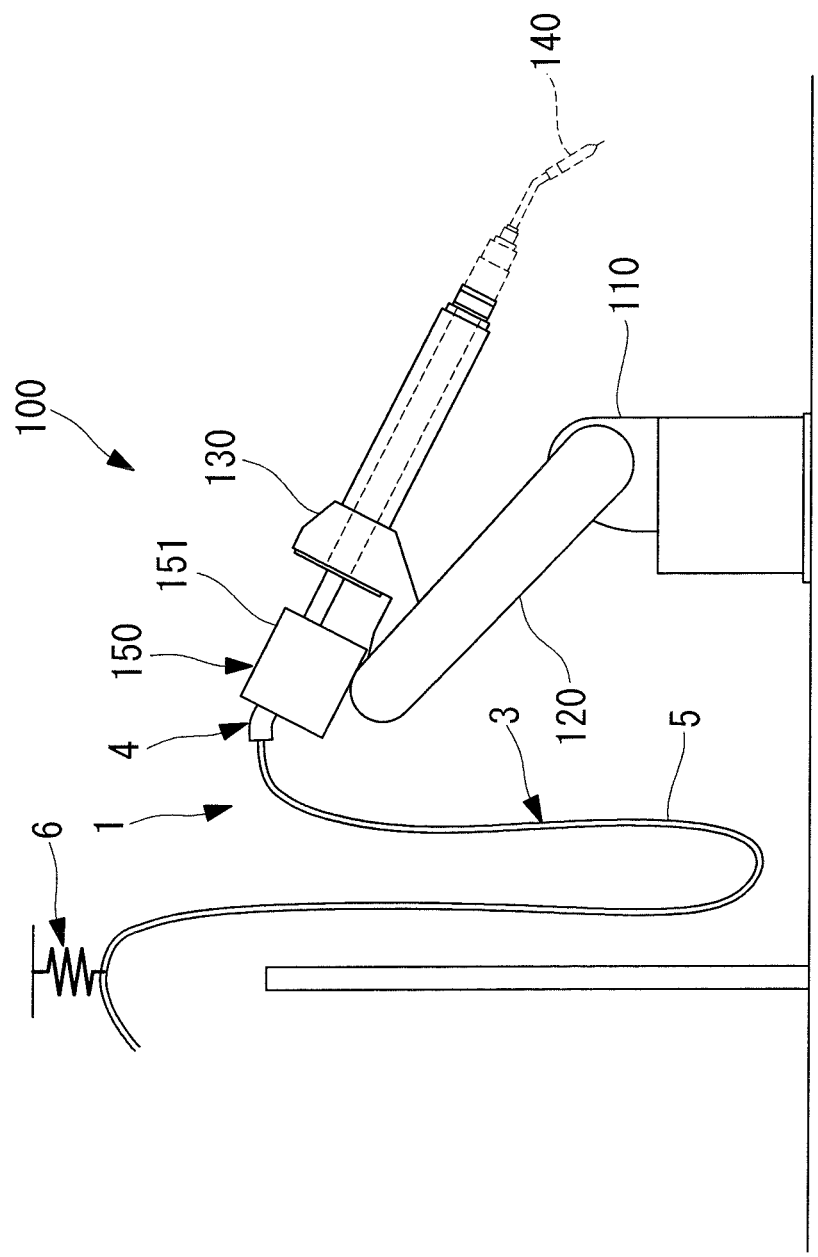
FIG. 5 is a diagram showing a case where a first arm of the arc welding robot of FIG. 1 is swung backward.

That is, compared with a conventional welding wire processing structure 200 as shown in FIG. 4 according to which the wire hose 3 extends along the feed direction of the welding wire 2 inside the housing 151, rearward protrusion of the wire hose 3 may be greatly reduced. As a result, an advantage that interference between the wire hose 3 and surrounding objects may be reduced at the time of operation of the arc welding robot 100, and an installation space for the arc welding robot 100 may be reduced may be achieved, as shown in FIG. 5.

Figure 6:
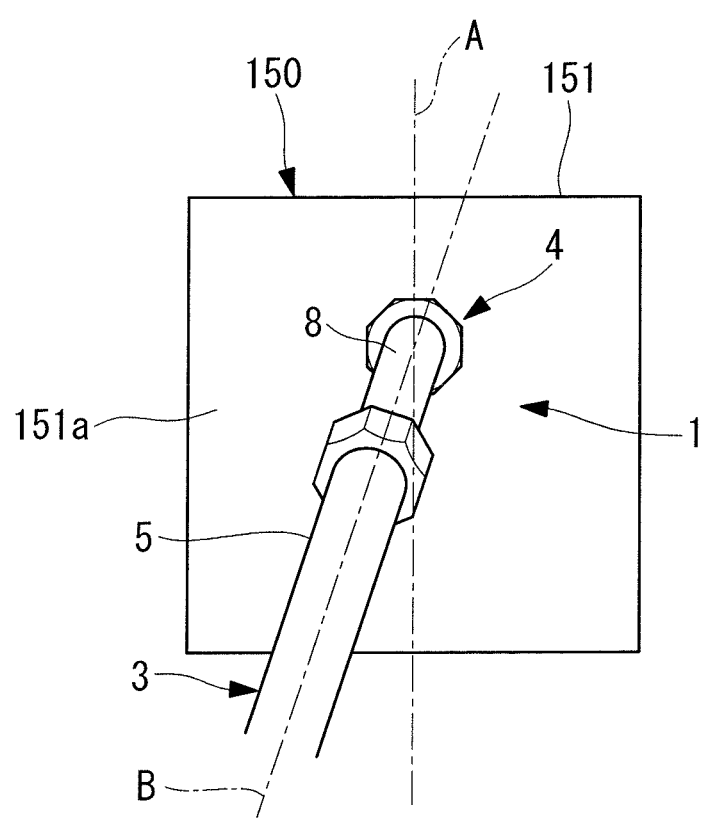
FIG. 6 is a rear view showing a modification of the welding wire processing structure of FIG. 3.

Additionally, as shown in FIG. 3, in the present embodiment, the wire hose 3 is connected by the connector 4 to the housing 151 of the wire feeder 150 from obliquely below on the vertical plane A. However, instead of such a configuration, the wire hose 3 may be connected to the housing 151 of the wire feeder 150 from obliquely below on a plane B inclined with respect to the vertical plane A, as shown in FIG. 6. This allows the wire hose 3 to be routed in a direction of avoiding interference with surrounding objects disposed on the rear left or the rear right of the arc welding robot 100. Therefore, interference with surrounding objects may be avoided even when the installation space for the arc welding robot 100 is reduced.

Also, the present embodiment describes a case where the inclination direction of the wire hose 3 is fixed by the connector 4 being fixed to the housing 151 of the wire feeder 150, but instead, the connector 4 may be attached to the housing 151 so as to be rotatable around an axis line C along the feed direction of the welding wire 2 inside the housing 151. Accordingly, the connector 4 is rotated to change the inclination direction of the wire hose 3, according to the swivel direction of the base 110 of the arc welding robot 100, and thus, application of an excessive force on the wire hose 3 may be prevented.

Figure 7:
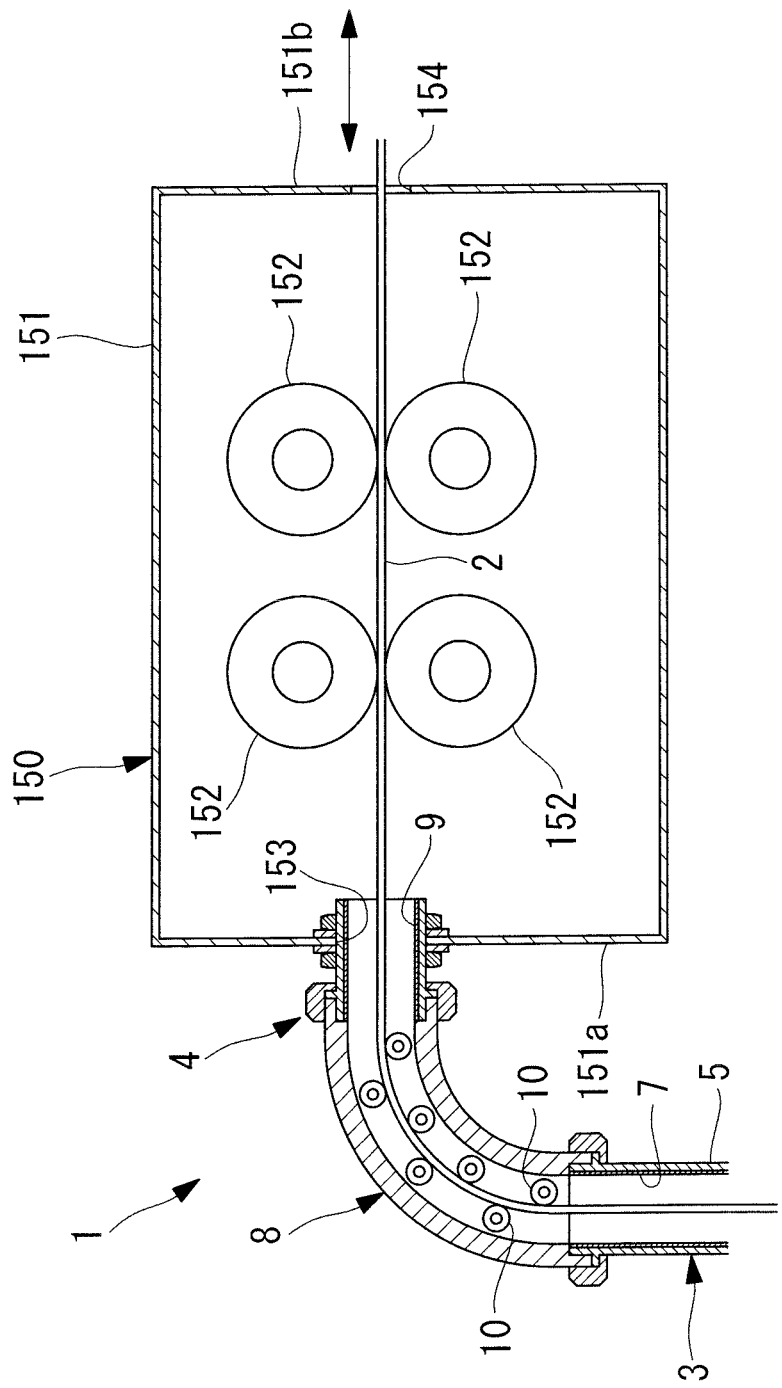
FIG. 7 is a vertical cross-sectional view of a wire feeder, showing a modification of the welding wire processing structure of FIG. 2.

Moreover, as shown in FIG. 7, in the present embodiment, the connector 4 may include a connector main body 8, and a plurality of guide rollers 10 rotatably supported inside the connector main body 8 to guide the welding wire 2 in the feed direction by coming into contact with an outer circumferential surface of the welding wire 2. Because the welding wire 2 passing through the connector main body 8 is guided by the guide rollers 10 to bend with a radius of curvature equal to or greater than a minimum allowable bend radius, the wire hose 3 may be attached while being inclined at a large inclination angle θ with respect to the feed direction of the welding wire 2 inside the housing 151, while preventing the welding wire 2 from being excessively bent and getting a tendency to bend in a particular way. Therefore, rearward protrusion of the wire hose 3 may be further suppressed.

Figure 8:
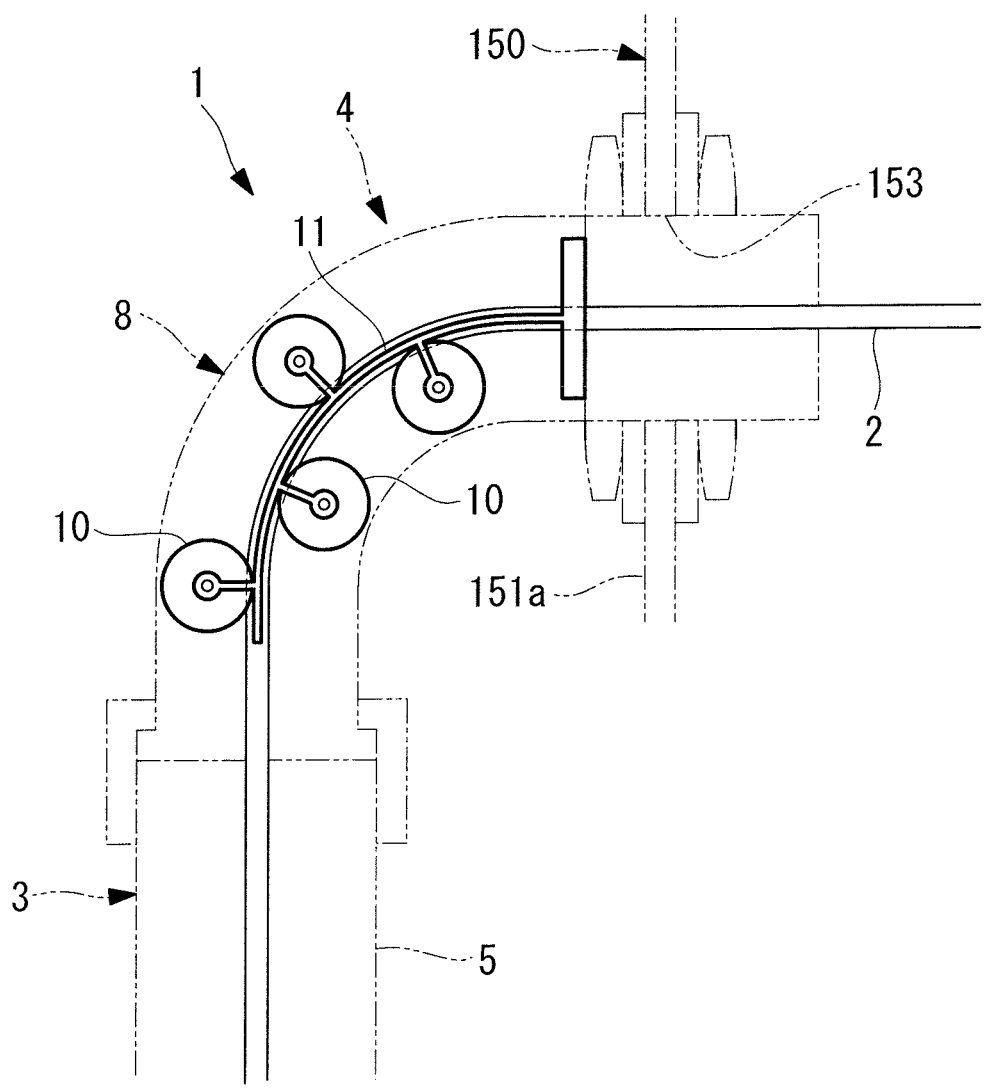
FIG. 8 is an internal structural view of a connector, showing a modification of the welding wire processing structure of FIG. 7.

Furthermore, as shown in FIG. 8, in the present embodiment, the connector main body 8 may be formed from a flexible material, and the guide rollers 10 may be biased, for example, by a flat spring 11 to a state where the welding wire 2 is bent as much as possible. In this case, the bend radius is preferably set to be equal to or greater than the minimum allowable bend radius even in a state where the welding wire 2 is bent as much as possible.

Figure 9:
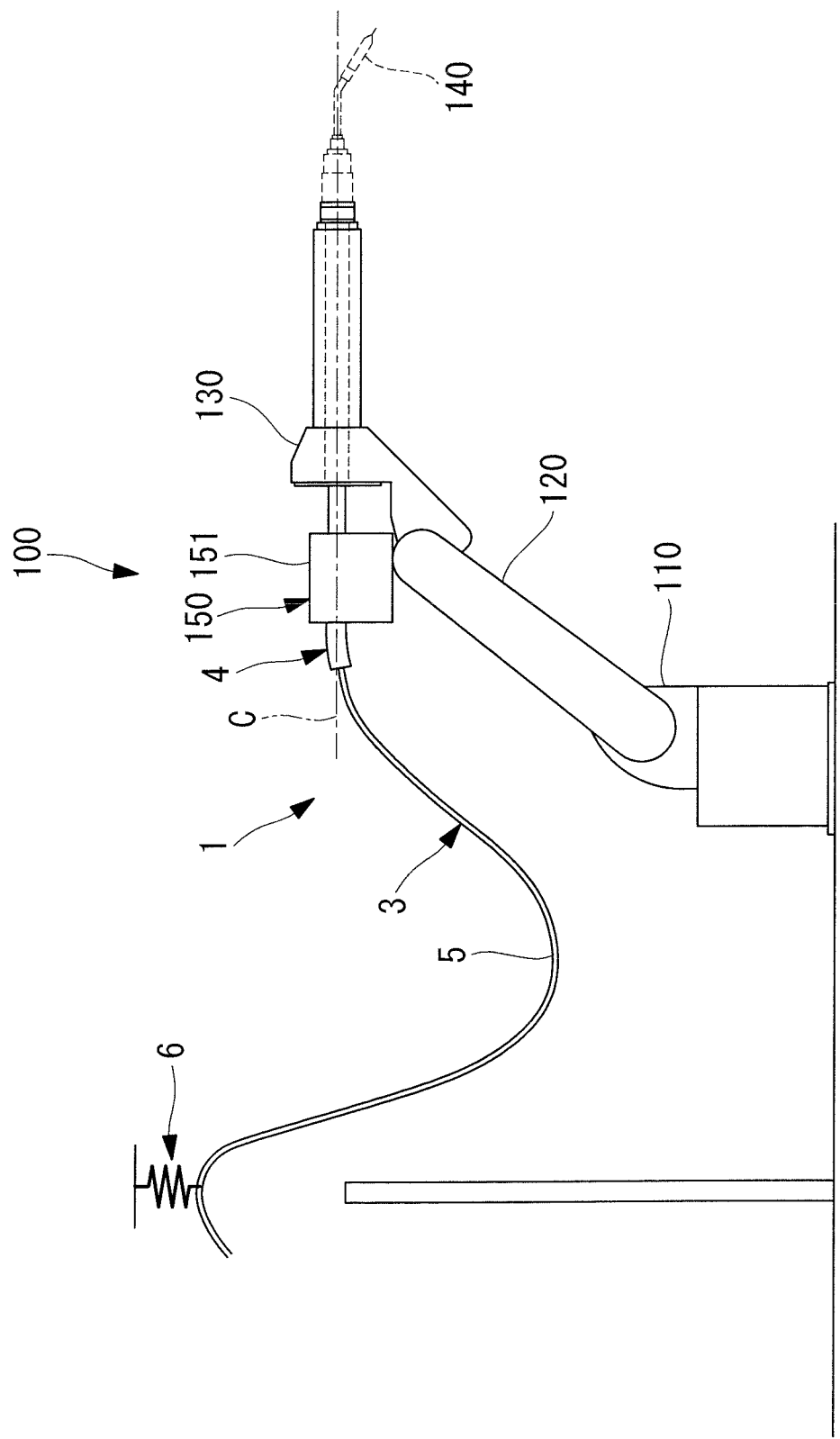
FIG. 9 is a diagram showing an arc welding robot provided with the welding wire processing structure of FIG. 8.

Accordingly, in a normal state, the connector main body 8 is bent and the welding wire 2 is bent as much as possible, and the wire hose 3 may be disposed without greatly protruding on the rear side of the wire feeder 150. On the other hand, as shown in FIG. 9, in the case where the arc welding robot 100 is operated at a posture where an excessive force is applied to the wire hose 3 if the wire hose 3 is in a bent state, the shape of the connector main body 8 may be changed, by an external force applied to the wire hose 3, in a direction of extending the bent connector main body 8 against the biasing force of the flat spring 11.

Figure 10:
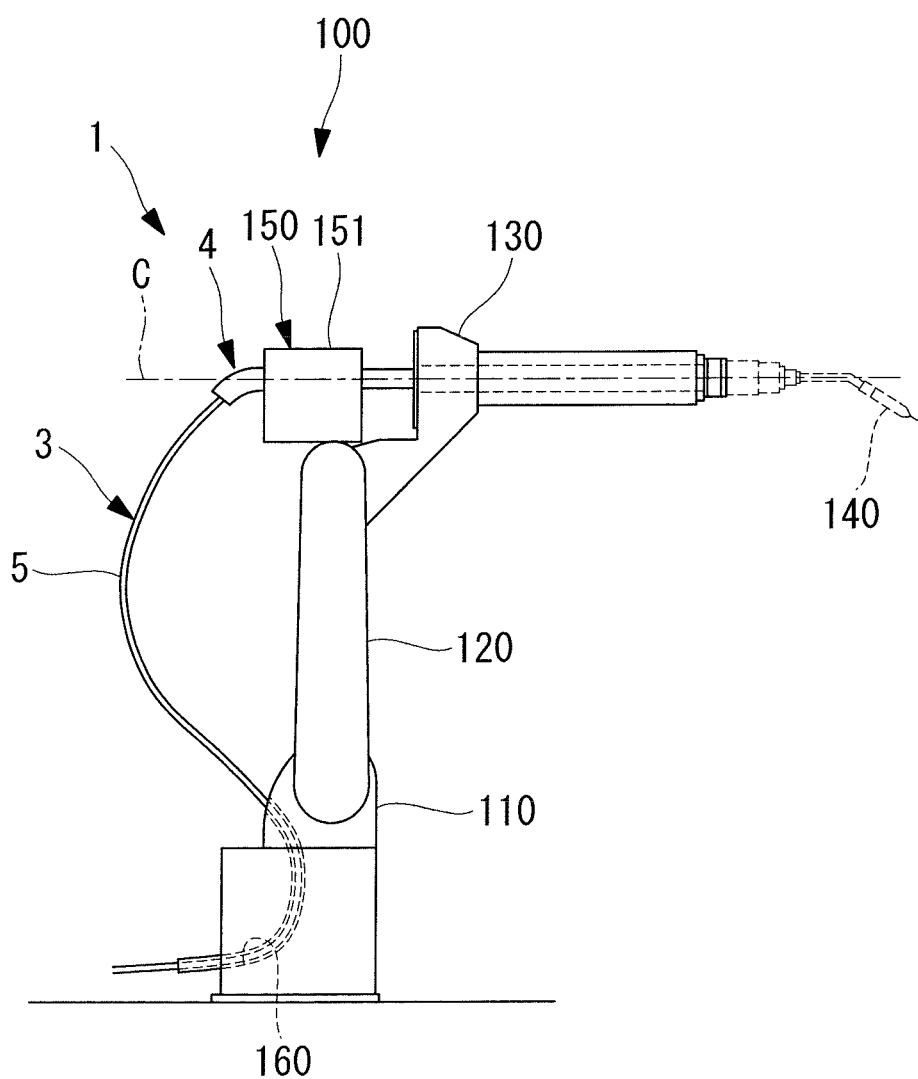
FIG. 10 is a diagram showing a modification of the welding wire processing structure of FIG. 1.

Furthermore, in the present embodiment, a mid-portion of the wire hose 3 in the longitudinal direction is supported by the ceiling suspension type holder 6 disposed behind the arc welding robot 100, but instead, the wire hose 3 may be routed through a wiring hole 160 provided to the base 110, as shown in FIG. 10.

Moreover, the connector 4 may be exchanged according to the type of welding wire 2. If the type of welding wire 2 is different, the minimum allowable bend radius of the welding wire 2 is also different, and the welding wire 2 may be set to be bent with an appropriate bend radius by exchanging the connector 4.

From the above-described embodiments and modifications thereof, the following aspects of the invention are derived.

An aspect of the present invention provides a welding wire processing structure of an arc welding robot, the welding wire processing structure including a wire hose for feeding a welding wire to a wire feeder that is attached to a rear portion of an arm provided with a welding torch at a tip, from a rear end surface of the wire feeder to a forward side, and a connector for attaching the wire hose to the rear end surface, where the connector connects the wire hose in a direction intersecting a feed direction of the welding wire by the wire feeder.

According to the present aspect, the welding wire fed by the wire hose is fed into the wire feeder through the rear end surface of the wire feeder, and is fed by the wire feeder to the welding torch provided at the tip of the arm. Because the connector for connecting the wire hose to the rear end surface of the wire feeder attaches the wire hose in a direction intersecting the feed direction by the wire feeder, the welding wire fed through the wire hose from behind is fed to the wire feeder after being bent inside the connector.

Accordingly, rearward protrusion of the wire hose from the rear end surface of the wire feeder is reduced, and interference with surrounding objects may be reduced. As a result, the installation space for the arc welding robot may be reduced.

In the aspect described above, the connector may be fixed to the wire feeder at an arbitrary angle around an axis line along the feed direction of the welding wire.

The welding wire may thereby be bent inside the connector and rearward protrusion of the wire hose from the rear end surface of the wire feeder may be reduced, and also, protrusion of the wire hose in one of left and right directions where surrounding objects exist may be suppressed, and thus, interference with surrounding objects may be more reliably avoided.

In the aspect described above, the connector may be attached to the wire feeder so as to be rotatable around an axis line along the feed direction of the welding wire.

The welding wire may thereby be bent inside the connector and rearward protrusion of the wire hose from the rear end surface of the wire feeder may be reduced, and also, the connector may be rotated according to operation of the arc welding robot and protrusion of the wire hose in both the left and right directions may be suppressed.

In the aspect described above, the connector may include a connector main body having a hollow portion that allows the welding wire fed through the wire hose to pass through, and a coil liner detachably attached to the connector main body so as to cover an inner surface of the hollow portion.

The welding wire bent inside the hollow portion thereby contacts the coil liner, and contact of the welding wire with the connector main body may be avoided. When the coil liner is worn, the coil liner can be replaced, and wear of the connector main body may be prevented.

In the aspect described above, the connector may include a connector main body having a hollow portion that allows the welding wire fed through the wire hose to pass through, and a plurality of guide rollers rotatably attached inside the connector main body to guide feeding of the welding wire to the wire feeder with a radius of curvature that is equal to or greater than a minimum allowable bend radius.

Accordingly, by causing the guide rollers to roll on an outer circumferential surface of the welding wire, movement of the welding wire inside the connector is guided by the plurality of guide rollers, and the bend radius of the welding wire may be prevented from becoming smaller than the minimum allowable bend radius. Accordingly, the welding wire to be fed to the wire feeder may be prevented from getting a tendency to bend in a particular way, and the welding wire may be appropriately fed to the welding torch.

In the aspect described above, the connector main body may have flexibility so as to allow a bend radius of the welding wire to be changed.

This allows the shape of the connector main body to be changed such that the bend radius of the welding wire is arbitrarily changed within a range of the minimum allowable bend radius or more and an excessive bending stress is not applied to the welding wire.

REFERENCE SIGNS LIST 1 welding wire processing structure
2 welding wire
3 wire hose
4 connector
8 connector main body
9 coil liner
10 guide roller
100 arc welding robot
130 second arm (arm)
140 welding torch
150 wire feeder
151a rear end surface

The invention claimed is:

1. A welding wire processing structure of an arc welding robot, the welding wire processing structure comprising:
    a wire hose for feeding a welding wire to a wire feeder that is attached to a rear portion of an arm provided with a welding torch at a tip, from a rear end surface of the wire feeder to a forward side; and a connector for attaching the wire hose to the rear end surface, wherein the connector connects the wire hose in a direction intersecting a feed direction of the welding wire at the rear end surface of the wire feeder, the connector being fixed to the wire feeder at an arbitrary angle around an axis line along the feed direction of the welding wire, and
    wherein an intersection angle between a longitudinal axis of the wire hose at an attachment position to the connector and the feed direction of the welding wire inside a housing is between 30 degrees and 90 degrees.

2. A welding wire processing structure of an arc welding robot, the welding wire processing structure comprising: a wire hose for feeding a welding wire to a wire feeder that is attached to a rear portion of an arm provided with a welding torch at a tip, from a rear end surface of the wire feeder to a forward side; and a connector for attaching the wire hose to the rear end surface, wherein the connector connects the wire hose in a direction intersecting a feed direction of the welding wire at the rear end surface of the wire feeder, the connector being attached to the wire feeder so as to be rotatable around an axis line along the feed direction of the welding wire, and the connector configured to rotate around the axis line while fixing an inclination of the wire hose relative to the feed direction of the welding wire, and
    wherein an intersection angle between a longitudinal axis of the wire hose at an attachment position to the connector and the feed direction of the welding wire inside a housing is between 30 degrees and 90 degrees.

3. The welding wire processing structure of an arc welding robot according to claim 1, wherein the connector includes a connector main body having a hollow portion that allows the welding wire fed through the wire hose to pass through, and a coil liner detachably attached to the connector main body so as to cover an inner surface of the hollow portion.

4. The welding wire processing structure of an arc welding robot according to claim 1, wherein the connector includes a connector main body having a hollow portion that allows the welding wire fed through the wire hose to pass through, and a plurality of guide rollers rotatably attached inside the connector main body to guide feeding of the welding wire to the wire feeder with a radius of curvature that is equal to or greater than a minimum allowable bend radius.

5. The welding wire processing structure of an arc welding robot according to claim 4, wherein the connector main body has flexibility so as to allow a bend radius of the welding wire to be changed.

* * * * *